T. R. SCHOENLEBER.
FILM FEEDING DEVICE FOR CAMERAS.
APPLICATION FILED AUG. 4, 1916.
1,219,672.
Patented Mar. 20, 1917.
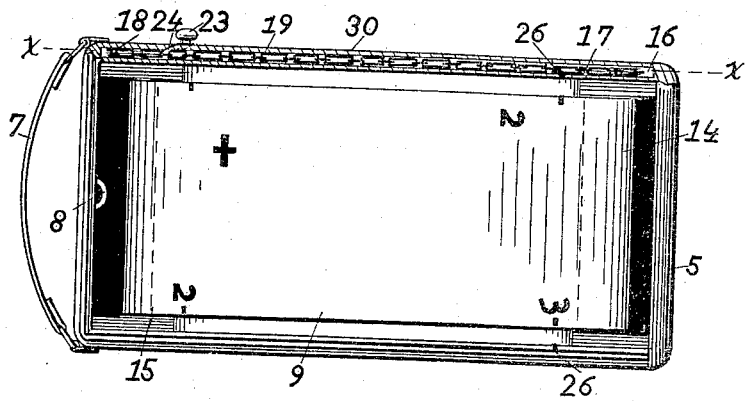
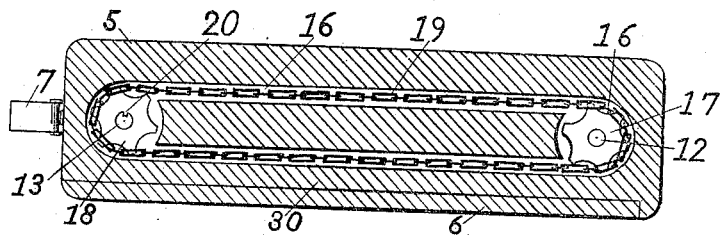
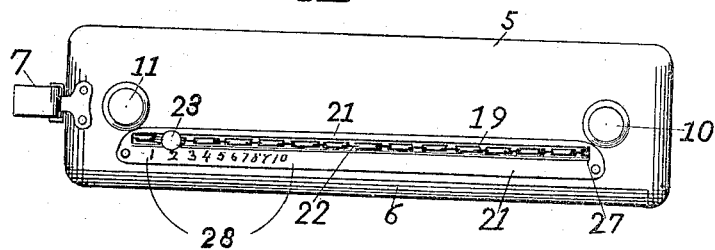

UNITED STATES PATENT OFFICE.

THOMAS R. SCHOENLEBER, OF SEATTLE, WASHINGTON.

FILM-FEEDING DEVICE FOR CAMERAS.

1,219,672.   Specification of Letters Patent.   Patented Mar. 20, 1917.

Application filed August 4, 1916. Serial No. 113,203.

*To all whom it may concern:*

Be it known that I, THOMAS R. SCHOENLEBER, a citizen of the United States, residing at Seattle, in the county of King and State of Washington, have invented certain new and useful Improvements in Film-Feeding Devices for Cameras, of which the following is a specification.

This invention relates to that class of photographic cameras which are adapted to use rolled films. Such cameras are usually provided with two pairs of short trunnions journaled in the sides of the camera box, and having ends projecting inward, one pair of these projecting ends to receive a roll of films and the other pair to receive an empty axle on which the films are to be rewound after exposure. The object of this invention is to provide means for winding the film from the original roll to the rewinding axle and for properly locating each film in the field of the lens, without the aid of a peep hole in the box.

To this end, my invention consists in the construction and combination of parts forming a film feeding device for cameras hereinafter more fully described, and particularly stated in the claims, reference being had to the accompanying drawing, in which:

Figure I, shows a side view of a camera according to my invention, with the side cover removed, and the top in longitudinal, vertical section.

Fig. II, shows a longitudinal, horizontal section on line $x$ Fig. I.

Fig. III, shows a top view of the camera with the side cover on.

Fig. IV, shows the carrier knob in side view, on a larger scale.

Numeral 5 represents a camera box, 6 the side cover, which is usually removable to open the box, as shown in Fig. I, for the purpose of inserting and removing films. The strap handle 7, is to carry it by, and 8 is a spring catch for holding the cover closed when in place. A film-carrying belt 9, shows upon its back, the usual markings that serve as guides to the operator in locating the films. The face for exposure is on the farther side. The knobs 10 and 11 are the exposed ends of trunnions 12 and 13, which pass through the sides of the box and receive on their inner ends, the roll of films 14 and the axle of the feeding roll 15.

The matters thus far described are common and well known.

In the top wall 30, of the box 5, I make a recess 16, in which I mount sprocket wheels 17 and 18 on the trunnions 12, 13, and these wheels are rotated by a chain 19 mounted on them. The feeding wheel 18, is connected with the trunnion 13 by a key 20 that fits a longitudinal slot in the trunnion, but the wheel 17 is free to revolve on its trunnion 12. By this arrangement the forward movement of the chain 19 operates the sprocket wheel 18, trunnion 13 and the feeding roll 15 to draw the film belt 9 forward from the film roll 14, and yet, the trunnions 12, 13, are free to slide longitudinally through the wheel as they are drawn or pushed outward to admit a roll of films. On the top of the box a strip of sheet metal 21 is fixed, and in this strip, and the box top, a slot 22 gives access to the chain 19. Mounted to slide in the slot, upon the metallic strip, is an operating knob 23, having a pawl 24 to engage links of the chain and carry it forward, that is to the left in the drawing, but to slide freely over the chain when the knob is on its return movement. A spring 25, carried by the knob and bearing against the strip 21, normally impels the pawl into engagement with the chain. As herein shown, the knob and the pawl are integral, and are so mounted as to be tipped by the action of the spring. The film belts 9 have numerals printed on their backs, usually from 1 to 10, indicating the space allotted to each film. As herein shown, film 2 is in position for exposure, and all the spaces, as from 2 to 3, are uniform in length, but as the winding roll 15 increases in circumference and the unwinding roll 14 diminishes at each advancing movement, the amount of motion of the chain to draw forward the film, grows less at each move. This permits a graduated scale to be marked at 28 on the strip 21, indicating by numerals the place for the knob 23 to be stopped to properly locate the successive films in the field of the lens. In operation, the new film roll and an empty axle are to be mounted on the trunnions 12 and 13; the belt 9 is to be attached to the axle of the roll 15 and turned forward by the chain 19 and knob 23 until the mark 1 on the belt is at the nicks 26 in the box; then put on the side cover 6 to close the box. Now bring the knob 23 to its starting point 27, and when a picture is to be taken, move the knob forward to index 1 on the scale 28. This moves the chain 19 and sprocket 18 to bring forward the first film ready for exposure. Leave the knob 23 at index 1 to show at any future time how many pictures have been taken, so it will be evident that to take another picture, the knob 23 should be brought back to its starting point 27, and then be moved forward to the next index number back of where it stood. Thus this device shows on the outside of the camera box how many exposures have been made on the inclosed film roll, and exactly how much movement to make to properly locate in the field of the lens, each succeeding film. It is simple, quick in operation, effective and inexpensive.

I claim:

1. In a film feeding device for cameras, a film roll and a film feeding roll journaled in a box; a wheel for each roll; a chain mounted on the wheels; the box having a slot in it over the line of the chain; a knob mounted in the slot to engage and slide upon the sides thereof; a pawl projecting down from the knob to engage the chain, and a spring actuating the knob to tip its forward edge into contact with the face of the box whereby the said forward edge serves as a pivot for the knob to tip upon.

2. In a film feeding device for cameras, a slotted box; a film roll; a film feeding roll; wheels for the rolls; a chain mounted on said wheels under the slot in the box; a knob mounted to engage the sides of the slot in the box and to rock to and fro fulcrumed on its forward edge on the box, the knob having a pawl to engage the said chain.

3. In a film feeding device for cameras, a film roll; a film feeding roll and a wheel for each roll mounted in a box; a chain upon the wheels; a slot over the chain in the box; a strip of sheet material on the box at the sides of the slot; an operating knob mounted to slide on the said strip and having a pawl to engage the chain; a graduated scale marked on the strip, the markings indicating the stopping point for the knob to locate the respective films for exposure; and a spring on the knob to engage the box top and hold the knob at each point indicating the number of exposures made.

In testimony whereof I affix my signature in presence of two witnesses.

THOMAS R. SCHOENLEBER.

Witnesses:
  ALBERT B. LORD,
  J. F. WINDIATE.

Copies of this patent may be obtained for five cents each, by addressing the "Commissioner of Patents, Washington, D. C."